Jan. 15, 1963     C. G. ROBERTS     3,073,284
VIBRATO DEVICE FOR HARVESTING EARTHWORMS
Filed May 12, 1958
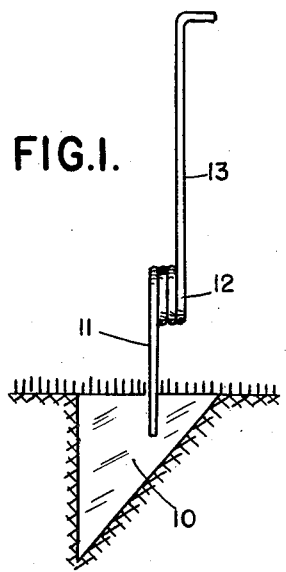
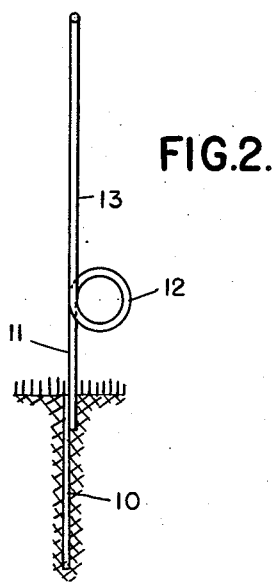
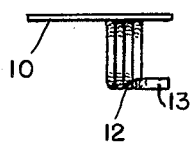
*INVENTOR.*
CHARLES G. ROBERTS
ATTORNEYS

United States Patent Office 3,073,284
Patented Jan. 15, 1963

3,073,284
VIBRATO DEVICE FOR HARVESTING EARTHWORMS
Charles G. Roberts, 23861 Verne Ave., Detroit 19, Mich.
Filed May 12, 1958, Ser. No. 734,743
2 Claims. (Cl. 116—137)

The present invention relates to means for harvesting earthworms, that is, a means for use in inducing earthworms to emerge from their burrows so that they may be collected.

The present invention is based on the fact that, when earthworms are disturbed in their burrows by earth vibrations, they immediately leave their burrows and emerge to the surface.

Among the objects of the invention is to provide means for imparting to such soil as may be suspected of harboring earthworms, a series of sharp vibrations.

Another object is to provide a simple, economically produced device for producing earth vibrations.

Other objects and advantages will readily occur to those skilled in the art upon reference to the following description and the accompanying drawing in which FIGURE 1 is a front elevation of an earth vibrator made according to the invention.

FIGURE 2 is a side elevation of the same.

FIGURE 3 is a top plan view.

In the drawings, the device is shown as consisting of a metal blade 10, which should be of material of sufficient rigidity to enter the earth without difficulty and is preferably sharpened to assist penetration. A suitable shape for the blade is triangular as shown, although the shape is immaterial to its function.

The blade 10 should, however, have an area sufficient to provide for maintaining its position when the device is operated.

Attached to the blade 10 is a resilient rod 11 preferably consisting of a metal rod coiled intermediate its length as at 12 to provide a relatively stiff spring located near the blade 10 and arranged with its axis parallel to the blade 10.

Above the spring 12 the rod is extended to provide a suitable handle 13 and also to provide sufficient weight of material to react through the spring to vibrate the plate 10 when the spring is flexed and the handle is released. The length and weight of the handle above the spring should be such as to provide a rather high frequency of vibration in the use of the device as described below.

The rod 11 may be attached to the blade 10 in any suitable manner but preferably by welding.

As indicated above, in the use of the device, the blade 10 is thrust into the ground and vibrated rapidly and violently by pulling the handle 13 laterally of the plate and releasing. The handle vibrations will be transmitted to the blade and to the adjacent soil, being transmitted therethrough for a considerable distance to disturb any worms therein. Such disturbance causes the worms to emerge and be easily captured.

Through an empirical approach, I found that a blade 10 made of 1/8 inch thick stock in the right triangle shape shown, 10 inches across the top and 10 inches long measured normal to the top edge, operated satisfactorily with the handle made of a length of 3/8 inch diameter rod about 18 inches long wound as shown to form three coils 2 inches in diameter and spaced about 4 inches from the top edge of the blade 10.

Although this is a specific embodiment of the invention, it will be apparent to one skilled in the art that various changes and modifications may be made therein without departing from the spirit of the invention or the scope of the appended claims.

I claim:

1. A device for harvesting earthworms comprising
    (a) a flat metal blade adapted to be inserted into the soil and means mounted on said blade operable to impart vibrations to said blade in a direction normal to the plane of said blade,
    (b) said vibrating means comprising a rod rigidly attached at one end to said blade and forming a handle portion at its other end, and having an intermediate portion comprising a relatively stiff coil spring.

2. A device for harvesting earthworms comprising
    (a) a flat metal blade adapted to be inserted into the soil and means mounted on said blade being operable to impart vibrations to said blade in a direction normal to the plane of said blade,
    (b) said blade having a sharpened point at the lower extremity and a broad upper edge whereby to facilitate insertion of the blade into the soil,
    (c) said vibrating means comprising a rod rigidly attached at one end to said blade and having a handle portion at its other end and having an intermediate portion comprising a relatively stiff coil spring wound on an axis parallel to the plane of said blade,
    (d) the length of said rod and the stiffness of said spring being so correlated as to provide for a high frequency of vibration.

References Cited in the file of this patent

UNITED STATES PATENTS

| | | |
|---|---|---|
| 1,223,276 | Haney | Apr. 17, 1917 |
| 2,536,341 | Asher | Jan. 2, 1951 |

FOREIGN PATENTS

| | | |
|---|---|---|
| 266,852 | Germany | Oct. 31, 1913 |

OTHER REFERENCES

Popular Mechanics (magazine), vol. 69, No. 3, page 342 (March 1938), article "Vibrato Rod Lures Worms for the Fisherman."

Washington Post (newspaper), published Tuesday, May 15, 1951, at Washington, D.C.; page 17, article "Angler Lures His Fishbait."